July 12, 1960  V. L. SNYDER  2,944,852
VERTICALLY COLLAPSIBLE AND TELESCOPING TRAILER BODY
Filed Aug. 19, 1955  5 Sheets-Sheet 1

INVENTOR.
Vilas L. Snyder
BY
M. Y. Charles
ATTORNEY.

July 12, 1960 V. L. SNYDER 2,944,852
VERTICALLY COLLAPSIBLE AND TELESCOPING TRAILER BODY
Filed Aug. 19, 1955 5 Sheets-Sheet 3

INVENTOR.
Vilas L. Snyder,
BY
M. Y. Charles
ATTORNEY.

July 12, 1960  V. L. SNYDER  2,944,852
VERTICALLY COLLAPSIBLE AND TELESCOPING TRAILER BODY
Filed Aug. 19, 1955  5 Sheets-Sheet 4

INVENTOR.
Vilas L. Snyder,
BY
M. Y. Charles
ATTORNEY.

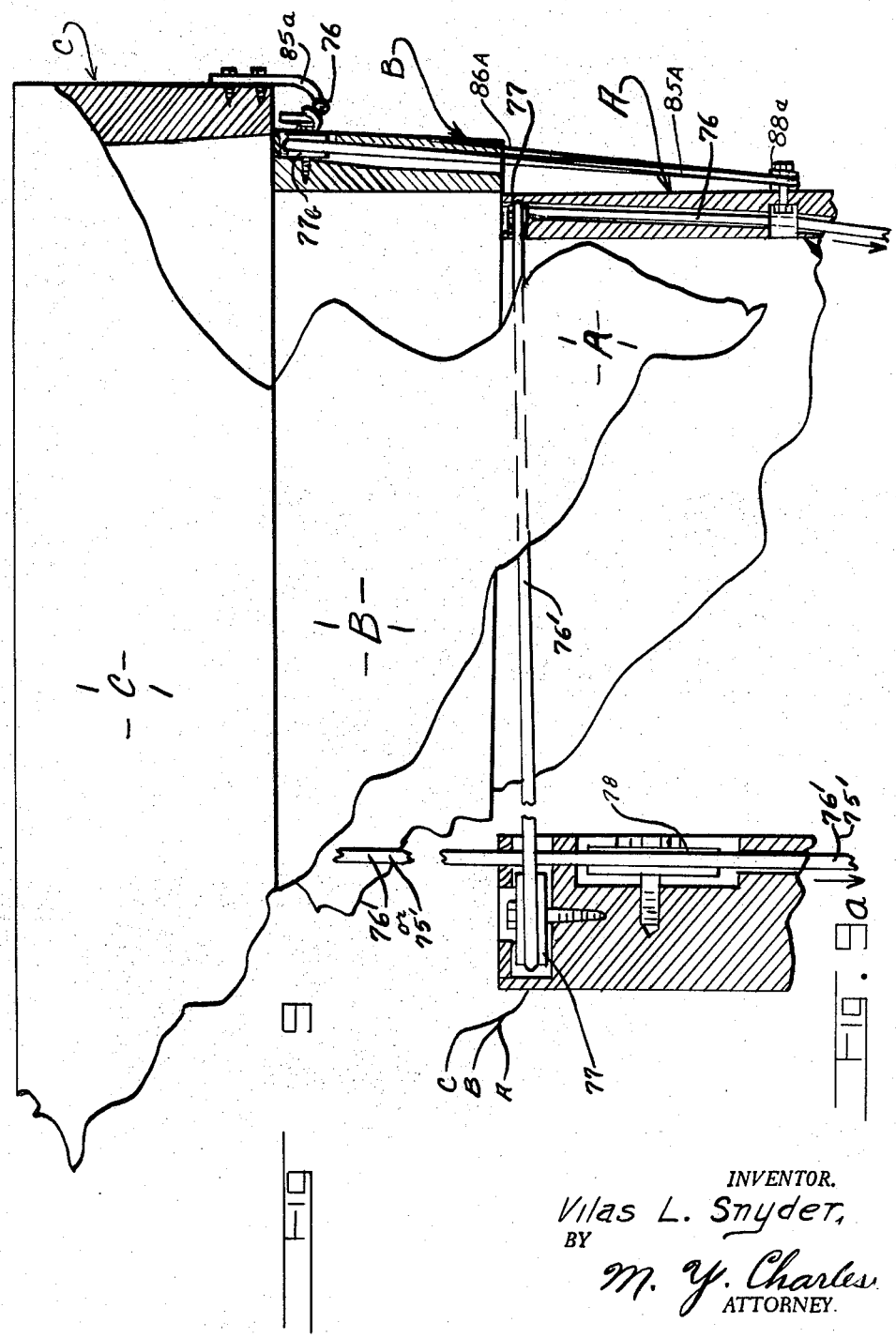

United States Patent Office 2,944,852
Patented July 12, 1960

2,944,852
VERTICALLY COLLAPSIBLE AND TELESCOPING TRAILER BODY

Vilas L. Snyder, 1906 S. Washington, Wichita, Kans.

Filed Aug. 19, 1955, Ser. No. 529,540

5 Claims. (Cl. 296—23)

My invention relates to an improvement in an extendable and retractable trailer house. The object of my invention is to provide a trailer house that can be easily towed behind a car or truck and easily and quickly attached to or detached from the car or truck.

A further object of my invention is to provide a trailer house of the kind mentioned that is so constructed that it may be raised in sections when it is to be used for sleeping or cooking or any other purpose for which trailer houses are designed and then when it is towed on the highway it can be let down in sections so that the driver of the car or truck can have a clear view of the highway for safety.

A further object of my invention is to provide a trailer house of the kind mentioned that when it is in its lowered position for traveling it has a minimum of wind resistance and is not top heavy for convenient travel on the road.

A still further object of my invention is to provide a trailer house of the kind mentioned that is comfortable to occupy, easy to operate, safe in its construction and attractive looking.

A still further object of my invention is to provide a trailer house of the kind mentioned that is simple, easy and inexpensive to build, sturdy in construction and one that is long lived. These and other objects will be more fully explained as this description progresses.

Now referring to the accompanying drawings in which similar numerals of reference designate the same parts through the several figures of the drawings:

Fig. 1 is a perspective view of the trailer house. In this view the trailer house is disconnected from the car and is in a raised position ready for occupancy.

Fig. 2 is a rear view of the trailer house. In this view the trailer house is seen as being connected to the car and is also in a lowered position for travel on the highway. This view is taken from the line II—II in Fig. 1 and looking in the direction of the arrows.

Figure 3:
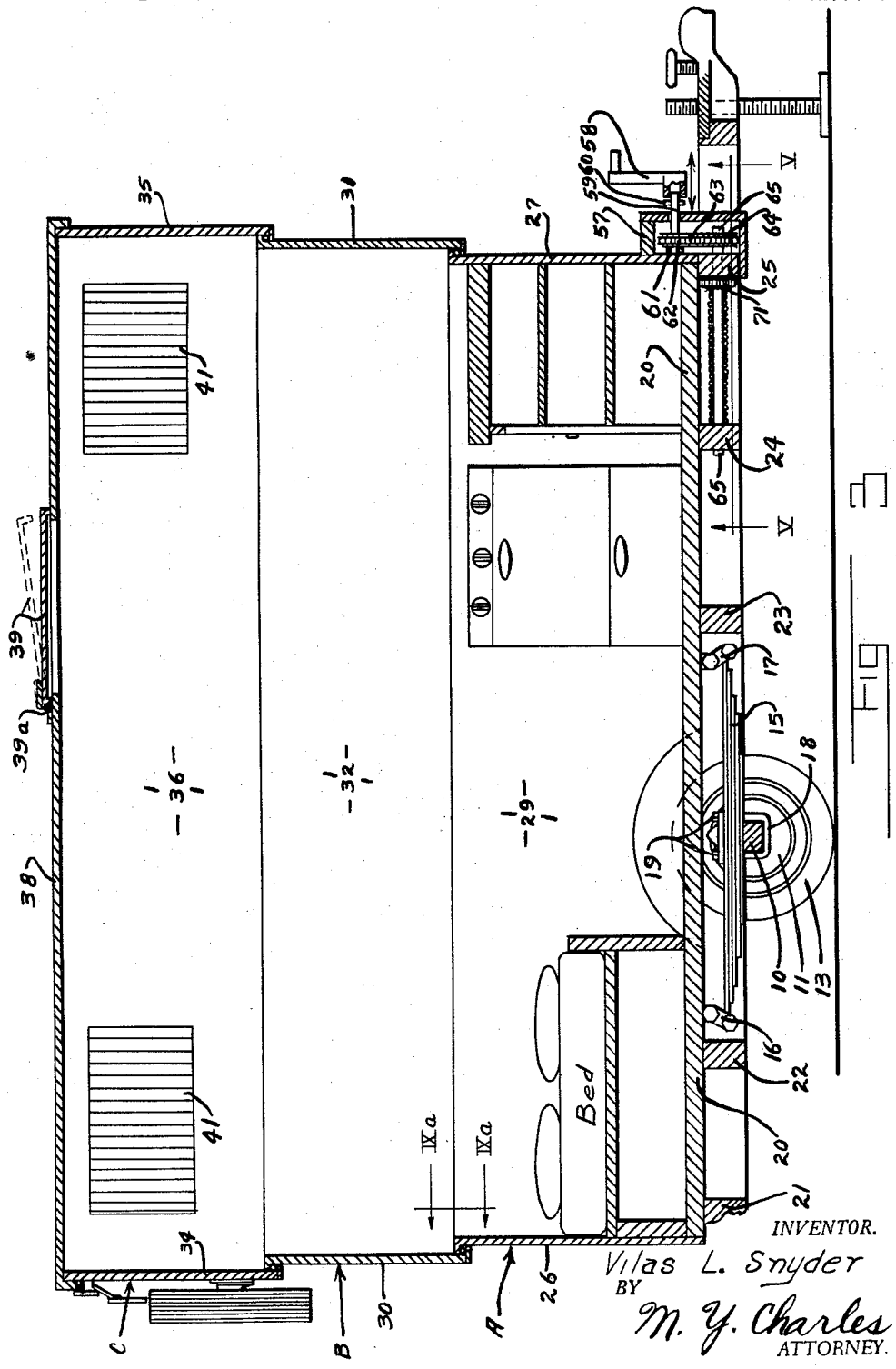
Fig. 3 is a detail cross sectional view of the trailer house.
Figure 8:
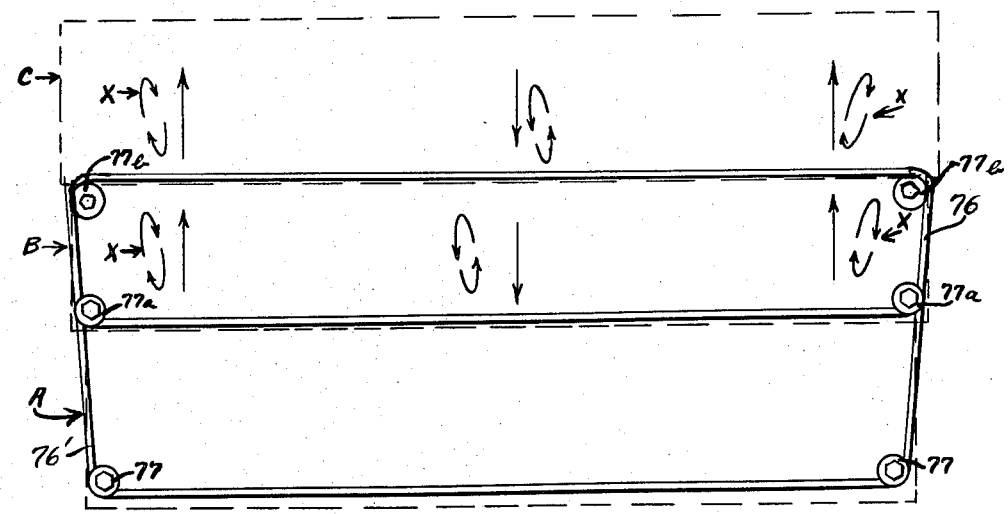
Figure 10:
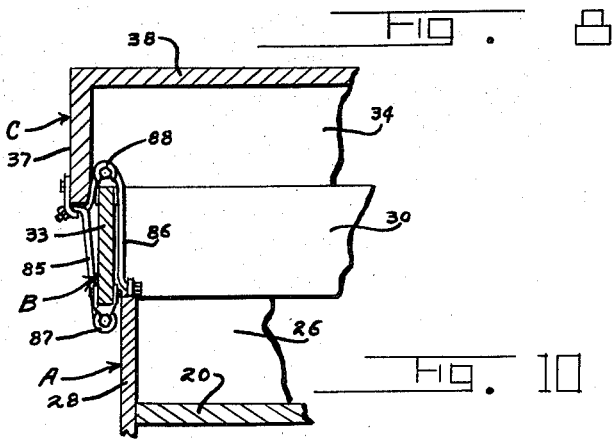

Fig. 8 is a detail rear view of the trailer house showing the three sections and the correct positions for all vertical cables and pulleys in the device. Fig. 9 is an enlarged detail sectional view of one corner of the trailer showing the three sections in cross section to illustrate the position of the cables and the pulleys located in the walls of the sections. Fig. 9a is an enlarged sectional view of the structure shown in Fig. 9, as shown by the line IXa—IXa in Fig. 3, and looking in the direction of the arrows. Fig. 10 is a vertical sectional view through the side wall of the body sections A, B and C, the view being as seen from the line X—X in Fig. 1 and looking in the direction of the arrows.

In the drawings is shown the conventional axle 10 on both outside ends of which are mounted two wheels 11 and 12 on which are mounted two tires 13 and 14. The axle 10 is flexibly held in place by two leaf springs 15 which are spaced evenly apart from the center of the axle 10 and fastened to the trailer floor by means of shackles 16 and 17 that are identical in construction with each other. The two springs 15 are fastened to the axle 10 by U bolts 18 which go around the axle and over the spring and have nuts 19 threaded thereon. The floor 20 of the trailer is made of heavy material and is supported by a series of cross members 21, 22, 23, 24 and 25. These cross members 21, 22, 23, 24 and 25 give strength and rigidity to the trailer and in connection with the floor 20, make up the strength of the trailer. Securely fastened to the floor 20 of the trailer are the ends 26 and 27 and the sides 28 and 29 of the first section A of the trailer. The ends 26 and 27 and the sides 28 and 29 are fastened at the corners and form the enclosed section A which when coupled with the floor 10 makes the base section of the trailer. Slidably receivable from the top and around the outside of section A is another section B which is the middle section and is composed of two ends 30 and 31 and two sides 32 and 33. In section B there is no top or bottom, as the bottom is received by the upper part of section A and the upper part of section B is slidably enclosed by the bottom portion of the top section C. Now slidably received from the top and around the outside of section B is another section C which is the top section of my house trailer. The top section C is composed of two ends 34 and 35 and two sides 36 and 37 and a slightly curved top 38. In the center of the top 38 and slightly closer to the front is positioned an air vent 39. This air vent 39 is also an escape hatch in case something would go wrong with the mechanism, that is—a person inside the trailer could easily climb out of the air vent 39. The air vent 39 is rockably fastened at one end by a hinge element 39a. The top section is provided with a series of light emitting, rain proof ventilators 41 that are identical. These ventilators 41 are also designed so that a person inside the trailer house can easily see out, but anyone on the outside cannot see in and they may be closed completely if desired, in cold weather.

Each individual section A, B and C is equipped with its own door opening. In section A is seen a door 42 that is hingeably mounted at 43. The door 42 is provided with a knob 44 which operates the conventional door latch (not shown). In the center section B a similar door 45 is provided and hingeably mounted at 46, which is farther back than the lower hinge mounting 43 so that both doors will open and not interfere with one another.

In the top section C a similar door 47 is provided and the hinge portion 48 is farther back still than the center hinge 46 so that all three doors 42, 45 and 47 can be opened and not interfere with one another.

The top door is provided with a knob 49 for the purpose of latching the door. Each of the three doors 42, 45 and 47 is provided with a ventilator 40, identical in design to the ventilators 41 and serving the same purpose. The center door 45 is held shut or open by the other two doors 42 and 47 so does not need a knob or latch as the other doors have.

Figure 4:
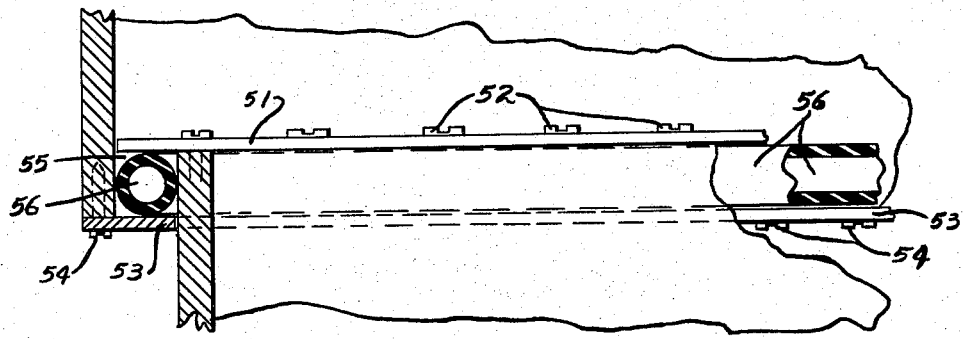
Fig. 4 is a detail sectional view of a portion of the trailer house showing the moisture and dust proof structure between the sections of the trailer body.
Figure 5:
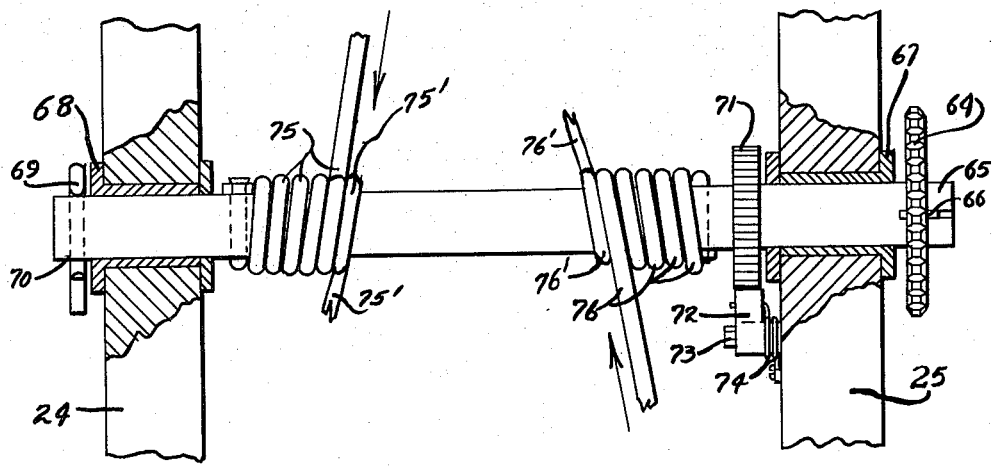
Fig. 5 is a detail sectional view of the winch which raises and lowers the sections of the device, the view being as seen from the line V—V in Fig. 3 and looking in the direction of the arrows.
Figure 6:
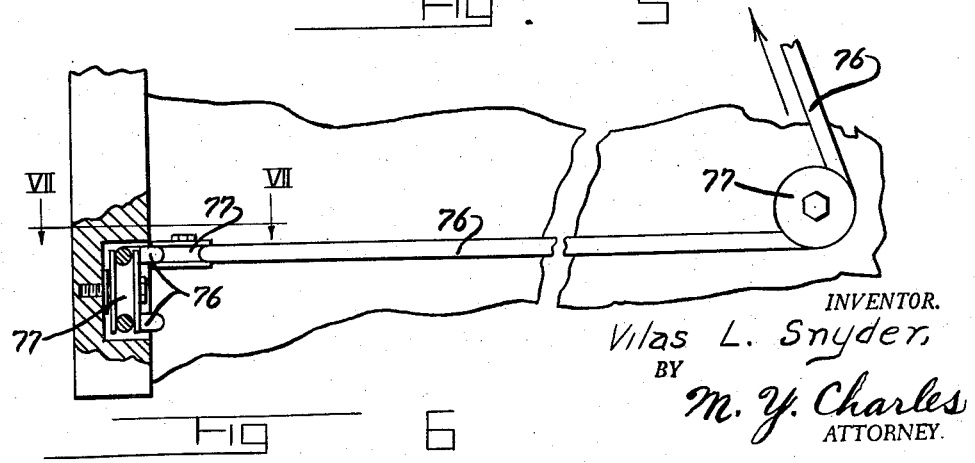
Fig. 6 is a detail broken sectional view showing the cable and pulleys structure existent at each corner of the body section A of the trailer.
Figure 7:
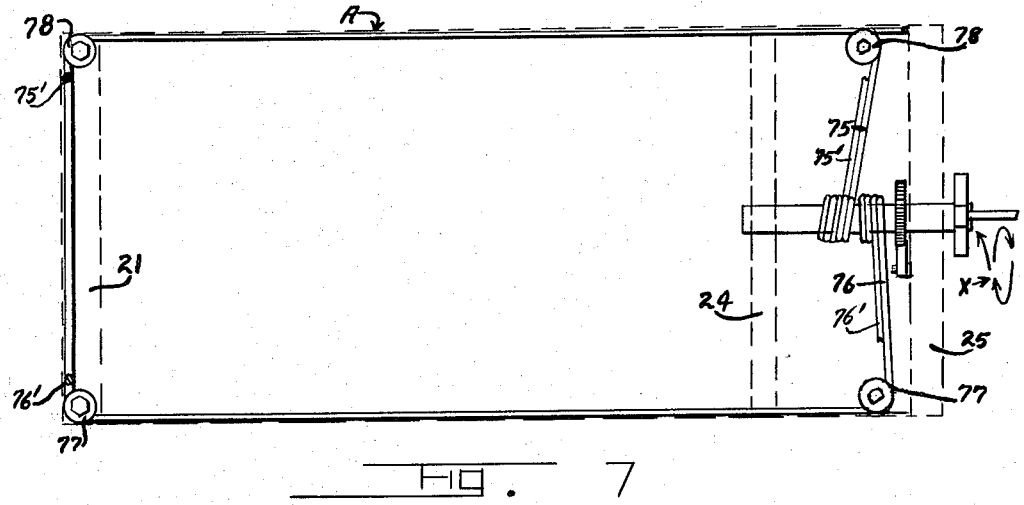
Fig. 7 is a top plan detail view of the lower section of the trailer showing the pulleys and cable in their position to raise and lower the sections, the view being as seen from the line VII—VII in Fig. 6 and looking in the direction of the arrows.

At the top of the lower section A is positioned a metal strip 51 that is fastened and held in place by a series of screws 52 (shown in Fig. 4 of the drawings) and on the bottom of the center section B is a matching metal strip 53 that is fastened and held in place by a series of screws 54. Positioned inside the space 55, which is formed by the ends and sides of the sections A and B and the two metal strips 51 and 53 is a hollow rubber tube 56 which forms an air proof, dust proof and moisture proof closure between the two sections A and B when in any position, raised or lowered. The same identical joint is provided between the upper edge of section B and the lower edge of the top section C and does the same identical job of making those sections B and C air proof, dust proof and moisture proof when the trailer is either raised or lowered.

The door opening completely passes through the side wall of the body section B and leaves a loose wall end at each side of the door opening. In as much as the door opening is close to one end of the trailer body the short body section wall of the section B need not be further supported, however the wall on the other side of the door must be supported and the support consists of two cables 85 and 86.

One end of each cable is rigidly attached to the upper edge of the side wall of section A, and the other end of each cable is rigidly attached to the lower edge of the side wall of the upper body section C and the cable 85 extends under the lower edge of the side wall of the middle body section B, and rides in a pulley 87 that is rigidly carried on the lower edge of the middle section wall B—thereby supporting the end of the wall of the section B.

The cable 86 passes upwardly and over the upper edge of the wall of the section B and rides in a pulley 88 that is rigidly carried on the upper edge of the wall of the section B. The operation of the above described assembly is as follows:

The roof structure carried on top of the section C is rigid and may be lifted by its four corners, as will later be described, without sagging between its four corners or its points of support and is therefore capable of lifting and supporting the loose end of the wall of section B adjacent the door opening in a manner that will later be described.

At the lower front of the trailer is located a winch arrangement which consists of a frame element 57 which is fastened to the trailer end 27 and the frame member 25. A detachable crank 58 can be positioned on the outer end of a shaft 59. A slot in the crank 58 fits perfectly with a pin 60 which is positioned in a hole in the outer end of the shaft 59 and the inside end of the shaft is positioned in a bearing 61. In the trailer wall a short distance out from the bearing 61 is securely fastened a sprocket wheel 62 to the shaft 59. Positioned on and around the sprocket 62 is a chain 63 which also is positioned on and around a second sprocket 64 that is securely fastened to a second shaft 65 by a key 66, as shown in Figs. 4 to 9 inclusive. The shaft 65 extends rearwardly through a bearing 67 which is positioned in the frame member 25 and on through and back to a second frame member 24 which also has a bearing 68 that receives the rearmost end of the shaft 65. The shaft 65 terminates at that point and a key 69 is positioned in a hole 70 in the shaft to hold the shaft 65 in the proper position. A ratchet gear 71 is positioned on the shaft 65 directly behind the frame 25 and a ratchet 72 is held in exact registry with the ratchet gear 71 by a bolt 73 and positioned on the ratchet 72 is a tension spring 74 which keeps the ratchet 72 always in contact with the gear 71 as will later be understood.

The device is provided with two cables 75 and 76, each of which is folded against itself and looped over bolts (not shown) that are threaded in the shaft 65 and are each wound around the shaft in the same direction, and then the two end portions of each cable extend in opposite directions as single operating cables 75 and 75′ and 76 and 76′ and extend one to each corner of the lower section A of the trailer body and there each cable passes around its respective pulley 77b and 76b; 77a and 77b and extends upwardly to and over another pulley on the top edge of the lower section A and then extends downwardly and attaches to the lower edge of the middle section B.

The upper section C is provided with a U-shaped element 85a that is fastened to the section C with two lag screws.

Figure 1:
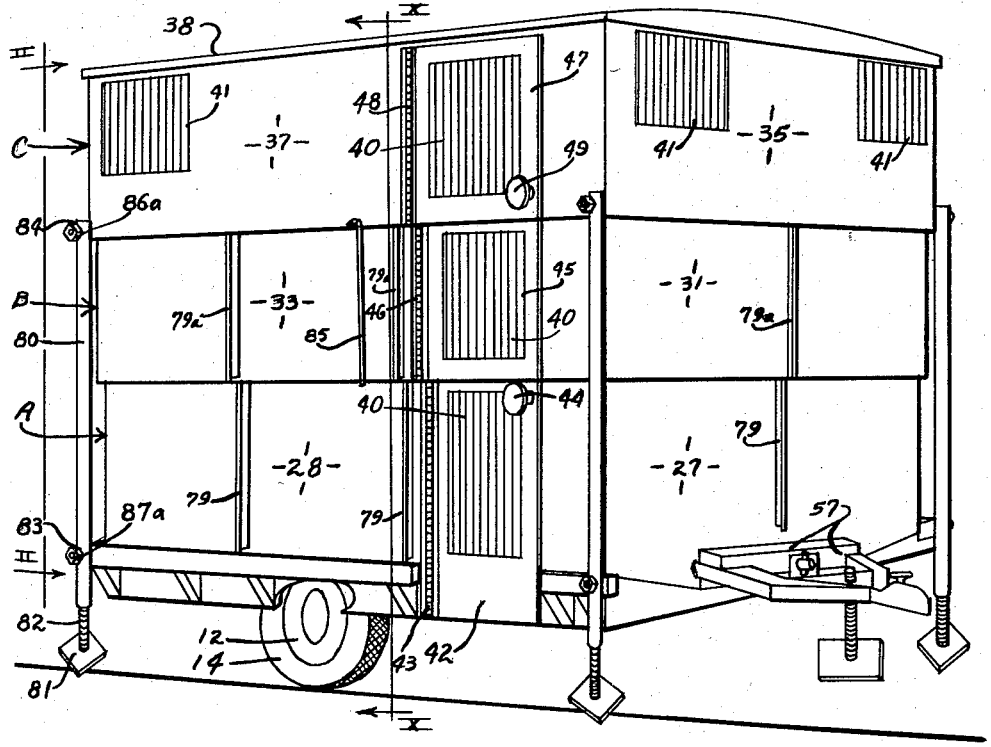
Figure 2:
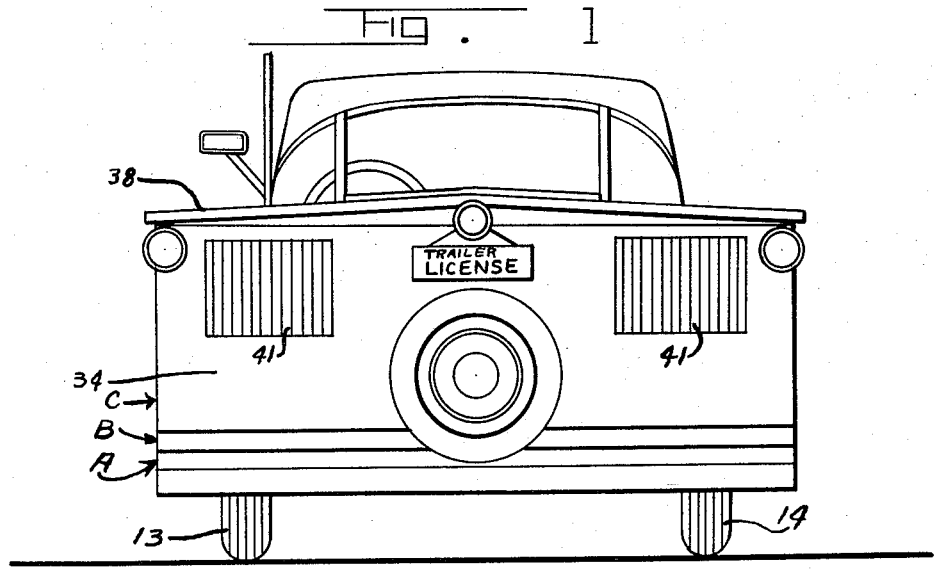

The device is further provided with four more cables 88, 88a, 88b, 88c located one at each corner of the trailer body. One end of each of these cables is attached to the upper edge portion of the lower section A, and extends over its respective pulleys 77b, 76b, 77a and 76a that are on the upper edge of the section B and then extend downwardly to and attach to the U-shaped elements 85a on the lower edge of the body section C as shown in Figs. 1 and 9.

Guides 79 are positioned on the outside of the lower section A which come into registry with grooves on the inside of the center section B and guides 79a are provided on the outsides of the ends and sides of the middle section B which come into registry with grooves in the inside of the top section C for the purpose of holding the sections B and C in perfect alignment as the trailer body sections are raised or lowered. Four adjustable and detachable legs 80 are provided, and all four legs are identical in construction, so one will be described. The leg is provided at the foot with a flat plate 81. Welded to the plate 81 is a threaded bar element 82 which can be either screwed into or out of the leg 80 as desired, depending on the contour of the ground on which the trailer is standing. By this means the trailer may be leveled and stabilized for use while the trailer is standing still. Two holes 83 and 84 are provided, one on the lower section and on the top section to receive bolts and their respective nuts 86a and 87a.

The hitch that pulls the trailer is of the conventional design as used on all trailers.

The operation of my trailer is as follows: a suitable parking place is found to park the trailer. The trailer can either be left hooked to the car or removed, whichever is desired. The crank 58 is inserted on the shaft 59 and the pin 60 comes into registry with the matching slot in the crank 58 by turning the crank 58 in the direction of the arrows X in Figs. 7 and 8. The sprocket 62 is fastened to the shaft 59 and rotates the chain 63 and in turn rotates the sprocket 64 which is rigidly mounted on the shaft 65, and in so doing revolves the shaft 65 in its respective bearings 67 and 68 in their respective frame members 25 and 24. This action causes a wrapping of the cables 75 and 75′ and 76 and 76′ onto the space provided on the winch shaft 65. The cables 75 and 75′; 76 and 76′ being wrapped onto the shaft 65 from opposite directions raise the section B and at the same time raise the section C relative to section B in a pushing action against the bight of the cables, 88, 88a, 88b, and 88c which is caused by the position and action of the pulleys 77, 77a, 77b and 78, 78a and 78b which are located in the two sections A and B of the trailer.

Simultaneously with the winding of the cables 75 and 76 into and around the pulleys 77, 77a and 77b and the pulleys on the other side 78, 78a and 78b in their respective positions on the trailer walls, and when the desired height is reached the ratchet 72 locks the ratchet gear 71 and the four legs 80 may be adjusted for the ground contour and fastened, one to each corner of the trailer for safety.

During the action just described the body section B will lift the two ends of the cables 85A and 86A that are rigidly attached thereto and in so doing the cable 85A will lift the loose end of the wall section B and support the wall so long as the body section C is in its elevated position and in this raising action the cable 86 will merely idle over its respective pulley 88a. As the body is lowered the upper section C of course will move downwardly and the loose end of the wall of the section B will also move downwardly under the influence of gravity. However, if for any reason the loose wall end would stick and not move down by gravity, the cable 86A would pull on and force the downward movement of the loose end of the wall of section B.

When ready to move again the above described operation may be repeated in reverse and the driver is on his way again with a trailer that he can see over the top for safety and one that is not top heavy and wind resistant.

While the device as shown and described is probably the preferred form of the invention, it is to be understood that such modifications of the invention may be employed as lie within the scope of the appended claims. Now having fully shown and described my invention, what I claim is:

1. In a trailer body structure of the kind described; said structure having a first, second and third horizontally disposed section; said first section being slidably receivable vertically within the second section, said second section being slidably receivable vertically within the third section; a cable winding device, said cable winding device being crank operated, said cable winding device also being rigidly carried immediately adjacent the said body structure, a first cable system and a second cable system, one end of each cable of the first cable system being connected with the said cable winding device and being adapted to be wound thereon for purposes of simultaneously pulling each of said cables and also being unwound therefrom for purposes of releasing the pulling action of said cables, each of said cables extending around a series of guide pulleys to selected points around the lower portion of the first body section, thence upwardly to the top of the first body section and over pulleys thereon, and thence downwardly and their remaining ends being rigidly connected to the lower edge of the second body section for purposes of raising and lowering the second body section, upon the winding of the cables on and off of the winding device relative to the first body section, said second system of cables being several in number and being located at selected points around the body structure, each cable of the second system of cables having one end thereof rigidly connected with the upper edge portion of the first said body section and then each cable of the second system of cables extending over a pulley carried on the upper edge of the second body section and thence extending downwardly and the remaining end thereof being rigidly attached to the lower edge of the third body section whereby the raising and lowering of the second body section as aforementioned will simultaneously raise and lower the third body section relative to the second said body section, said cable winding device having ratchet means therein for holding the winding device and the second and third body sections in any adjusted, elevated position.

2. In a trailer body structure of the kind described; the structure, parts and arrangement thereof as defined in claim 1, a third system of cables, said third system of cables comprising a first and second cable, one end of each cable being rigidly connected to the upper edge of the first body section, the first cable of the third cable system extending over a pulley carried on the upper edge of the second body section and thence extending downwardly and the remaining end thereof being rigidly attached to the lower edge of the third body section, the second cable of the third cable system extending downwardly and around a pulley, carried on the lower edge of the second body section and the remaining end of the second cable being rigidly attached to the lower edge of the third body section where, by the raising and lowering of the third body section as aforedescribed, the third body section will raise and lower and stabilize the wall of the second body section adjacent any opening that extends through the full height of the second body section.

3. In a trailer body structure of the kind described; the structure, parts and arrangement thereof as defined in claim 1, the combination of the said wall sections having a door opening therein, and each of said door openings having a door section hingedly swung therein, and means carried on each of said door sections and cooperable, each with its adjacent door section to assemble and constitute a full door closure for the full door opening when the second and third body sections are in their fully elevated positions.

4. In a trailer body structure of the kind described; the structure, parts and arrangement thereof as defined in claim 1, the combination of the said wall sections having a door opening therein, and each of said door openings having a door section hingedly swung therein, and means carried on each of said door sections and cooperable, each with its adjacent door section to assemble and constitute a full door closure for the full door opening when the second and third body sections are in their fully elevated positions, and means in the second body section for admitting light and ventilation into the trailer body when the second and third body sections are in their fully elevated positions, said means for admitting light and ventilation being window openings and openable and closable window sash in said window openings.

5. In a trailer body structure of the kind described; the structure, parts and arrangement thereof as defined in claim 1, the combination of the said wall sections having a door opening therein, and each of said door openings having a door section hingedly swung therein, and means carried on each of said door sections and cooperable, each with its adjacent door section to assemble and constitute a full door closure for the full door opening when the second and third body sections are in their fully elevated positions, and means in the second body section for admitting light and ventilation into the trailer body when the second and third body sections are in their fully elevated positions, said means for admitting light and ventilation being window openings and openable and closable window sash in said window openings, the foregoing combination being further characterized by the third body section having an escape and ventilating opening in the top thereof and a closure for said opening; said closure being hingedly attached to the top of its respective body sections as a means of adjustable attachment thereto.

References Cited in the file of this patent

UNITED STATES PATENTS

| 642,991 | Macfee | Feb. 6, 1900 |
| 1,852,984 | Smith | Apr. 5, 1932 |
| 2,538,736 | Spencer | Jan. 16, 1951 |
| 2,555,942 | Supplee | June 5, 1951 |
| 2,739,833 | Schenkel et al. | Mar. 27, 1956 |

FOREIGN PATENTS

| 493,762 | Germany | Mar. 14, 1930 |
| 573,470 | Germany | Dec. 22, 1929 |
| 271,388 | Great Britain | May 26, 1927 |
| 445,040 | Great Britain | Apr. 2, 1936 |